United States Patent
Karr et al.

(10) Patent No.: US 10,678,452 B2
(45) Date of Patent: *Jun. 9, 2020

(54) DISTRIBUTED DELETION OF A FILE AND DIRECTORY HIERARCHY

(71) Applicant: Pure Storage, Inc., Mountain View, CA (US)

(72) Inventors: Ronald Karr, Mountain View, CA (US); Robert Lee, Mountain View, CA (US); Igor Ostrovsky, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/421,284

(22) Filed: Jan. 31, 2017

(65) Prior Publication Data

US 2018/0075053 A1 Mar. 15, 2018

Related U.S. Application Data

(60) Provisional application No. 62/395,338, filed on Sep. 15, 2016.

(51) Int. Cl.
| | | |
|---|---|---|
| *G06F 7/00* | (2006.01) | |
| *G06F 3/06* | (2006.01) | |
| *G06F 16/11* | (2019.01) | |
| *G06F 16/16* | (2019.01) | |
| *G06F 16/176* | (2019.01) | |
| *G06F 12/02* | (2006.01) | |

(52) U.S. Cl.
CPC ............ *G06F 3/0623* (2013.01); *G06F 3/061* (2013.01); *G06F 3/0605* (2013.01);
(Continued)

(58) Field of Classification Search
CPC ......... G06F 17/30117; G06F 17/30103; G06F 17/30067; G06F 17/30097; G06F 17/30551
See application file for complete search history.

(56) References Cited

U.S. PATENT DOCUMENTS

| | | |
|---|---|---|
| 5,390,327 A | 2/1995 | Lubbers et al. |
| 5,479,653 A | 12/1995 | Jones |

(Continued)

FOREIGN PATENT DOCUMENTS

| | | |
|---|---|---|
| EP | 2164006 | 3/2010 |
| EP | 2256621 | 12/2010 |

(Continued)

OTHER PUBLICATIONS

Wong, Theodore M., et al., "Verifiable secret redistribution for archive systems," In: Proceedings on First International IEEE Security in Storage Workshop 2002, (SISW '02), pp. 1-12, Dec. 11, 2002.

(Continued)

*Primary Examiner* — Daniel A Kuddus
(74) *Attorney, Agent, or Firm* — Womble Bond Dickinson (US) LLP

(57) ABSTRACT

A method of distributed file deletion, performed by a storage system, is provided. The method includes receiving, at the storage system, a request to delete a directory and contents of the directory and adding the directory to a first set, listed in a memory in the storage system. The method includes operating on the first set, by examining each directory in the first set to identify subdirectories, adding each identified subdirectory to the first set as a directory, and adding each examined directory to a second set listed in the memory. The method includes deleting in a distributed manner across the storage system without concern for order, contents of directories, and the directories, listed in the second set.

20 Claims, 11 Drawing Sheets

(52) U.S. Cl.
CPC .......... *G06F 3/0637* (2013.01); *G06F 3/0643* (2013.01); *G06F 3/0652* (2013.01); *G06F 3/0659* (2013.01); *G06F 3/0679* (2013.01); *G06F 3/0685* (2013.01); *G06F 12/0253* (2013.01); *G06F 16/122* (2019.01); *G06F 16/162* (2019.01); *G06F 16/1774* (2019.01); *G06F 2212/7205* (2013.01)

(56) References Cited

U.S. PATENT DOCUMENTS

| | | | |
|---|---|---|---|
| 5,649,093 A | 7/1997 | Hanko et al. | |
| 5,764,767 A | 6/1998 | Beimel et al. | |
| 6,182,214 B1 | 1/2001 | Hardjono | |
| 6,275,898 B1 | 8/2001 | DeKoning | |
| 6,535,417 B2 | 3/2003 | Tsuda | |
| 6,643,748 B1 | 11/2003 | Wieland | |
| 6,725,392 B1 | 4/2004 | Frey et al. | |
| 6,826,570 B1 * | 11/2004 | Eshel ................ | G06F 16/1774 |
| 6,836,816 B2 | 12/2004 | Kendall | |
| 6,985,995 B2 | 1/2006 | Holland et al. | |
| 7,032,125 B2 | 4/2006 | Holt et al. | |
| 7,051,155 B2 | 5/2006 | Talagala et al. | |
| 7,065,617 B2 | 6/2006 | Wang | |
| 7,069,383 B2 | 6/2006 | Yamamoto et al. | |
| 7,076,606 B2 | 7/2006 | Orsley | |
| 7,107,480 B1 | 9/2006 | Moshayedi et al. | |
| 7,159,150 B2 | 1/2007 | Kenchammana-Hosekote et al. | |
| 7,162,575 B2 | 1/2007 | Dalal et al. | |
| 7,164,608 B2 | 1/2007 | Lee | |
| 7,334,156 B2 | 2/2008 | Land et al. | |
| 7,370,220 B1 | 5/2008 | Nguyen et al. | |
| 7,424,498 B1 | 9/2008 | Patterson | |
| 7,424,592 B1 * | 9/2008 | Karr ................ | G06F 3/0605 |
| | | | 711/203 |
| 7,444,532 B2 | 10/2008 | Masuyama et al. | |
| 7,480,658 B2 | 1/2009 | Heinla et al. | |
| 7,536,506 B2 | 5/2009 | Ashmore et al. | |
| 7,558,859 B2 | 7/2009 | Kasiolas | |
| 7,565,446 B2 | 7/2009 | Talagala et al. | |
| 7,613,947 B1 | 11/2009 | Coatney | |
| 7,647,355 B2 * | 1/2010 | Best ................ | G06F 3/0608 |
| | | | 707/999.2 |
| 7,681,104 B1 | 3/2010 | Sim-Tang et al. | |
| 7,681,105 B1 | 3/2010 | Sim-Tang et al. | |
| 7,730,258 B1 | 6/2010 | Smith | |
| 7,743,276 B2 | 6/2010 | Jacobsen et al. | |
| 7,757,038 B2 | 7/2010 | Kitahara | |
| 7,778,960 B1 | 8/2010 | Chatterjee et al. | |
| 7,814,272 B2 | 10/2010 | Barrall et al. | |
| 7,814,273 B2 | 10/2010 | Barrall et al. | |
| 7,818,531 B2 | 10/2010 | Barrall et al. | |
| 7,827,351 B2 | 11/2010 | Suetsugu et al. | |
| 7,827,439 B2 | 11/2010 | Matthew et al. | |
| 7,870,105 B2 | 1/2011 | Arakawa et al. | |
| 7,882,068 B2 * | 2/2011 | Schack ................ | G06F 11/1435 |
| | | | 707/639 |
| 7,885,938 B1 | 2/2011 | Greene et al. | |
| 7,886,111 B2 | 2/2011 | Klemm et al. | |
| 7,908,448 B1 | 3/2011 | Chatterjee et al. | |
| 7,916,538 B2 | 3/2011 | Jeon et al. | |
| 7,941,697 B2 | 5/2011 | Mathew et al. | |
| 7,958,303 B2 | 6/2011 | Shuster | |
| 7,971,129 B2 | 6/2011 | Watson | |
| 7,991,822 B2 | 8/2011 | Bish et al. | |
| 8,010,485 B1 | 8/2011 | Chatterjee et al. | |
| 8,010,829 B1 | 8/2011 | Chatterjee et al. | |
| 8,020,047 B2 | 9/2011 | Courtney | |
| 8,046,548 B1 | 10/2011 | Chatterjee et al. | |
| 8,051,361 B2 | 11/2011 | Sim-Tang et al. | |
| 8,051,362 B2 | 11/2011 | Li et al. | |
| 8,082,393 B2 | 12/2011 | Galloway et al. | |
| 8,086,634 B2 | 12/2011 | Mimatsu | |
| 8,086,911 B1 | 12/2011 | Taylor | |
| 8,090,837 B2 | 1/2012 | Shin et al. | |
| 8,108,502 B2 | 1/2012 | Tabbara et al. | |
| 8,117,388 B2 | 3/2012 | Jernigan, IV | |
| 8,140,821 B1 | 3/2012 | Raizen et al. | |
| 8,145,736 B1 | 3/2012 | Tewari et al. | |
| 8,145,838 B1 | 3/2012 | Miller et al. | |
| 8,145,840 B2 | 3/2012 | Koul et al. | |
| 8,176,360 B2 | 5/2012 | Frost et al. | |
| 8,180,855 B2 | 5/2012 | Aiello et al. | |
| 8,200,632 B2 * | 6/2012 | Schack ................ | G06F 11/1435 |
| | | | 707/639 |
| 8,200,922 B2 | 6/2012 | McKean et al. | |
| 8,225,006 B1 | 7/2012 | Karamcheti | |
| 8,239,618 B2 | 8/2012 | Kotzur et al. | |
| 8,244,999 B1 | 8/2012 | Chatterjee et al. | |
| 8,305,811 B2 | 11/2012 | Jeon | |
| 8,315,999 B2 | 11/2012 | Chatley et al. | |
| 8,316,438 B1 * | 11/2012 | Bush ................ | H04L 12/66 |
| | | | 726/22 |
| 8,325,691 B2 * | 12/2012 | Reynolds ................ | H04B 7/2606 |
| | | | 370/328 |
| 8,327,080 B1 | 12/2012 | Der | |
| 8,351,290 B1 | 1/2013 | Huang et al. | |
| 8,352,691 B2 * | 1/2013 | Grusy ................ | G06F 12/0804 |
| | | | 711/156 |
| 8,375,146 B2 | 2/2013 | Sinclair | |
| 8,397,016 B2 | 3/2013 | Talagala et al. | |
| 8,402,152 B2 | 3/2013 | Duran | |
| 8,412,880 B2 | 4/2013 | Leibowitz et al. | |
| 8,423,739 B2 | 4/2013 | Ash et al. | |
| 8,429,436 B2 | 4/2013 | Filingim et al. | |
| 8,473,778 B2 | 6/2013 | Simitci | |
| 8,478,849 B2 * | 7/2013 | Marl ................ | H04L 12/2807 |
| | | | 709/223 |
| 8,479,037 B1 | 7/2013 | Chatterjee et al. | |
| 8,498,967 B1 | 7/2013 | Chatterjee et al. | |
| 8,522,073 B2 | 8/2013 | Cohen | |
| 8,533,527 B2 | 9/2013 | Daikokuya et al. | |
| 8,544,029 B2 | 9/2013 | Bakke et al. | |
| 8,589,625 B2 | 11/2013 | Colgrove et al. | |
| 8,595,455 B2 | 11/2013 | Chatterjee et al. | |
| 8,615,599 B1 | 12/2013 | Takefman et al. | |
| 8,627,136 B2 | 1/2014 | Shankar et al. | |
| 8,627,138 B1 | 1/2014 | Clark | |
| 8,660,131 B2 | 2/2014 | Vermunt et al. | |
| 8,661,218 B1 | 2/2014 | Piszczek et al. | |
| 8,700,585 B2 * | 4/2014 | Vaghani ................ | G06F 16/1767 |
| | | | 707/704 |
| 8,700,875 B1 | 4/2014 | Barron et al. | |
| 8,706,694 B2 | 4/2014 | Chatterjee et al. | |
| 8,706,914 B2 | 4/2014 | Duchesneau | |
| 8,713,405 B2 | 4/2014 | Healey et al. | |
| 8,725,730 B2 | 5/2014 | Keeton et al. | |
| 8,756,387 B2 | 6/2014 | Frost et al. | |
| 8,762,793 B2 | 6/2014 | Grube et al. | |
| 8,775,858 B2 | 7/2014 | Gower et al. | |
| 8,775,868 B2 | 7/2014 | Colgrove et al. | |
| 8,788,913 B1 | 7/2014 | Xin et al. | |
| 8,799,746 B2 | 8/2014 | Baker et al. | |
| 8,819,311 B2 | 8/2014 | Liao | |
| 8,819,383 B1 | 8/2014 | Jobanputra et al. | |
| 8,824,261 B1 | 9/2014 | Miller et al. | |
| 8,843,700 B1 | 9/2014 | Salessi et al. | |
| 8,850,108 B1 | 9/2014 | Hayes et al. | |
| 8,850,288 B1 | 9/2014 | Lazier et al. | |
| 8,856,593 B2 | 10/2014 | Eckhardt et al. | |
| 8,856,619 B1 | 10/2014 | Cypher | |
| 8,862,847 B2 | 10/2014 | Feng et al. | |
| 8,862,928 B2 | 10/2014 | Xavier et al. | |
| 8,868,825 B1 | 10/2014 | Hayes | |
| 8,874,836 B1 | 10/2014 | Hayes | |
| 8,886,778 B2 | 11/2014 | Nedved et al. | |
| 8,898,383 B2 | 11/2014 | Yamamoto et al. | |
| 8,898,388 B1 | 11/2014 | Kimmel | |
| 8,904,231 B2 | 12/2014 | Coatney et al. | |
| 8,918,478 B2 | 12/2014 | Ozzie et al. | |
| 8,930,307 B2 | 1/2015 | Colgrove et al. | |
| 8,930,633 B2 | 1/2015 | Amit et al. | |
| 8,949,502 B2 | 2/2015 | McKnight et al. | |
| 8,959,110 B2 | 2/2015 | Smith et al. | |

(56) References Cited

U.S. PATENT DOCUMENTS

| | | |
|---|---|---|
| 8,977,597 B2 | 3/2015 | Ganesh et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,053,808 B2 | 6/2015 | Sprouse |
| 9,058,155 B2 | 6/2015 | Cepulis et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,134,908 B2 | 9/2015 | Horn et al. |
| 9,153,337 B2 | 10/2015 | Sutardja |
| 9,189,650 B2 | 11/2015 | Jaye et al. |
| 9,201,733 B2 | 12/2015 | Verma |
| 9,207,876 B2 | 12/2015 | Shu et al. |
| 9,251,066 B2 | 2/2016 | Colgrove et al. |
| 9,323,667 B2 | 4/2016 | Bennett |
| 9,323,681 B2 | 4/2016 | Apostolides et al. |
| 9,348,538 B2 | 5/2016 | Mallaiah et al. |
| 9,384,082 B1 | 7/2016 | Lee et al. |
| 9,390,019 B2 | 7/2016 | Patterson |
| 9,405,478 B2 | 8/2016 | Koseki et al. |
| 9,432,541 B2 | 8/2016 | Ishida |
| 9,477,632 B2 | 10/2016 | Du |
| 9,552,299 B2 | 1/2017 | Stalzer |
| 9,818,478 B2 | 11/2017 | Chung |
| 9,829,066 B2 | 11/2017 | Thomas et al. |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0033205 A1 | 2/2007 | Pradhan |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0022133 A1* | 1/2008 | Sobel .............. G06F 21/6218 713/193 |
| 2008/0080709 A1 | 4/2008 | Michtchenko et al. |
| 2008/0095375 A1 | 4/2008 | Takeoka et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0055607 A1* | 2/2009 | Schack .............. G06F 11/1435 711/162 |
| 2009/0077208 A1 | 3/2009 | Nguyen et al. |
| 2009/0106248 A1* | 4/2009 | Vaghani .............. G06F 16/1767 |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0049755 A1* | 2/2010 | Best ................. G06F 3/0608 707/E17.01 |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2010/0312915 A1 | 12/2010 | Marowsky-Bree et al. |
| 2011/0035540 A1 | 2/2011 | Fitzgerald et al. |
| 2011/0040925 A1 | 2/2011 | Frost et al. |
| 2011/0060927 A1 | 3/2011 | Fillingim et al. |
| 2011/0119234 A1* | 5/2011 | Schack .............. G06F 11/1435 707/639 |
| 2011/0119462 A1 | 5/2011 | Leach et al. |
| 2011/0167154 A1* | 7/2011 | Bush .................. H04L 12/2807 709/224 |
| 2011/0219170 A1 | 9/2011 | Frost et al. |
| 2011/0225417 A1* | 9/2011 | Maharajh ............. G06F 21/10 713/150 |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0047312 A1* | 2/2012 | Nathuji ............... G06F 9/3832 711/6 |
| 2012/0047342 A1* | 2/2012 | Grusy ................ G06F 12/0804 711/163 |
| 2012/0079318 A1 | 3/2012 | Colgrove et al. |
| 2012/0110249 A1 | 5/2012 | Jeong et al. |
| 2012/0131253 A1 | 5/2012 | McKnight |
| 2012/0150826 A1 | 6/2012 | Retnamma et al. |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawicki et al. |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0259234 A1 | 10/2013 | Acar et al. |
| 2013/0262758 A1 | 10/2013 | Smith et al. |
| 2013/0339314 A1 | 12/2013 | Carpenter et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0101373 A1* | 4/2014 | Lee .................... G06F 3/0655 711/103 |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0089623 A1 | 3/2015 | Sondhi et al. |
| 2015/0100746 A1 | 4/2015 | Rychlik |
| 2015/0134824 A1 | 5/2015 | Mickens et al. |
| 2015/0153800 A1 | 6/2015 | Lucal et al. |
| 2015/0180714 A1 | 6/2015 | Chunn |

(56) References Cited

U.S. PATENT DOCUMENTS

| | | |
|---|---|---|
| 2015/0280959 A1 | 10/2015 | Vincent |
| 2017/0123975 A1* | 5/2017 | Tseng .................... G06F 3/0608 |

FOREIGN PATENT DOCUMENTS

| | | |
|---|---|---|
| EP | 2639997 | 9/2013 |
| WO | 02-130033 | 2/2002 |
| WO | 2006069235 | 6/2006 |
| WO | 2008103569 | 8/2008 |
| WO | 2008157081 | 12/2008 |
| WO | 2012174427 | 12/2012 |
| WO | 2013032544 | 3/2013 |
| WO | 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

Storer, Mark W., et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

* cited by examiner

DISTRIBUTED DELETION OF A FILE AND DIRECTORY HIERARCHY

BACKGROUND

With traditional file system kernels, to delete a directory a user must first traverse the entire directory and delete files and subdirectories from the bottom up, starting with the leafs (or leaves). Only when all of the contents of the parent directory have been manually deleted can the parent directory be deleted, for example using the UNIX command rmdir. The remove directory command, rmdir directory_name, will only remove an empty directory. There is a UNIX command that will remove a directory and all of the contents of the directory, however, these commands require the user specify the entire directory tree. In addition, the operating system that is interpreting the command must still communicate with the file system to do the directory tree tracing from the top down, and removal of the leafs from bottom-up, which incurs a lot of communication overhead. Other equivalent commands for deleting an entire tree for other operating systems exist, but in all of these alternatives deletion occurs from bottom-up through the tree after the directory tree is first traced from top-down. Each subdirectory is only deleted after it is emptied. Deletion of the top directory must wait until all subdirectories below it have been emptied. The above mechanisms while arguably suitable for hard disk drives, are not optimized for solid-state media.

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. It is within this context that the embodiments arise.

SUMMARY

In some embodiments, a method of distributed file deletion, performed by a storage system, is provided. The method includes receiving, at the storage system, a request to delete a directory and contents of the directory and adding the directory to a first set, listed in a memory in the storage system. The method includes operating on the first set, by examining each directory in the first set to identify subdirectories, adding each identified subdirectory to the first set as a directory, and adding each examined directory to a second set listed in the memory. The method includes deleting in a distributed manner across the storage system without concern for order, contents of directories, and the directories, listed in the second set. The method may be embodied on a computer readable medium or executed by a storage system in some embodiments.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
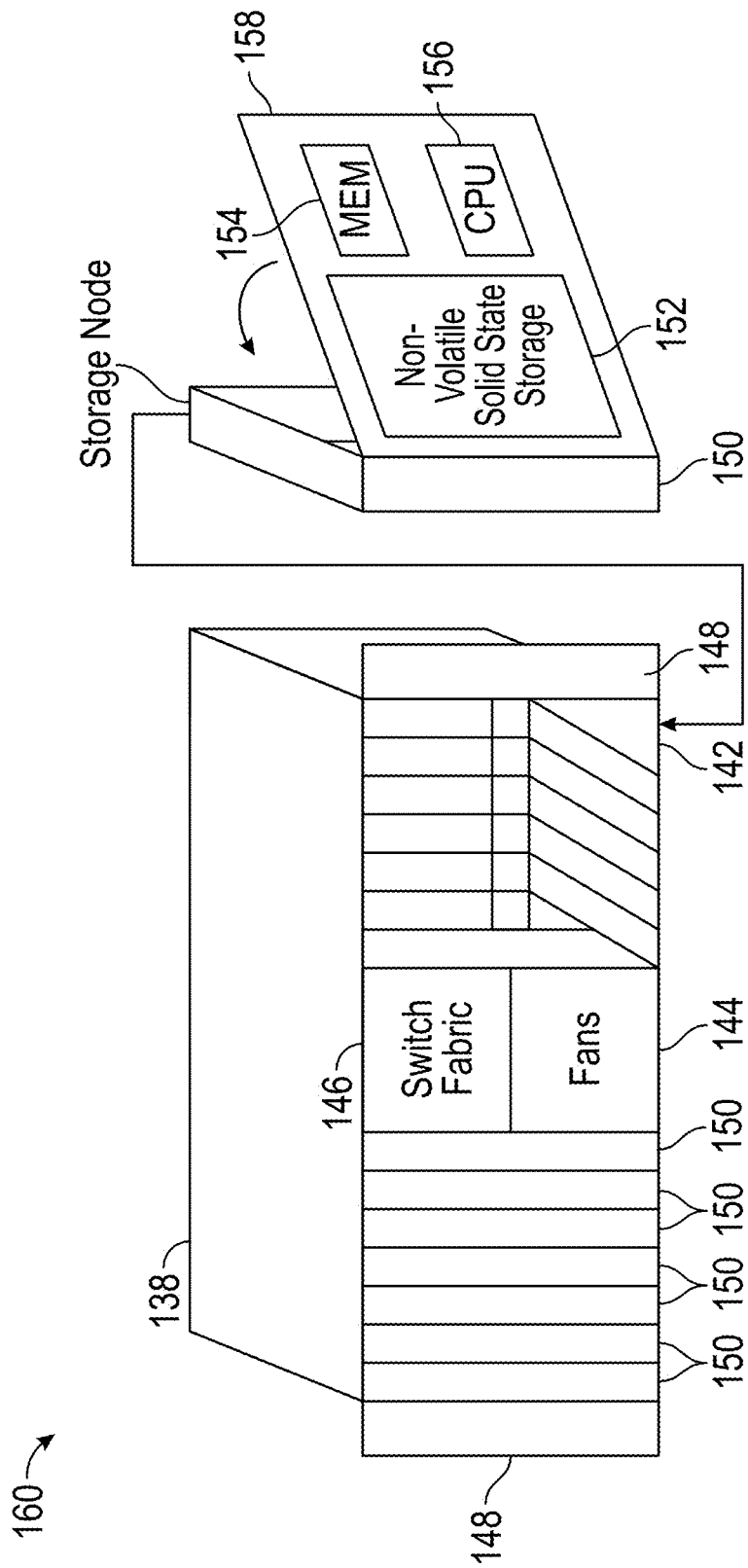
FIG. 1 is a perspective view of a storage cluster with multiple storage nodes and internal storage coupled to each storage node to provide network attached storage, in accordance with some embodiments.

Various mechanisms described herein efficiently delete a directory and an entire directory tree extending from the specified directory, without requiring the user to manually specify an entire directory tree or have an operating system or file system communicate requests for deletion of each file and each subdirectory to a storage system. Instead of tracing a directory tree from top-down, then deleting leafs from bottom-up and only deleting subdirectories when empty, as is usually the case in file systems, various embodiments of a storage system perform iterative search and destroy processes and background deletions in parallel for greater efficiency and decreased latency in response to a request to delete a directory tree. In some embodiments, a special-named directory is established for deletion of an entire directory tree. FIGS. 1-7 show various embodiments of a storage cluster, with storage nodes and solid-state storage units suitable for embodiments that practice distributed directory and file deletion. FIGS. 8A-10 show aspects of distributed file deletion, and distributed directory deletion.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
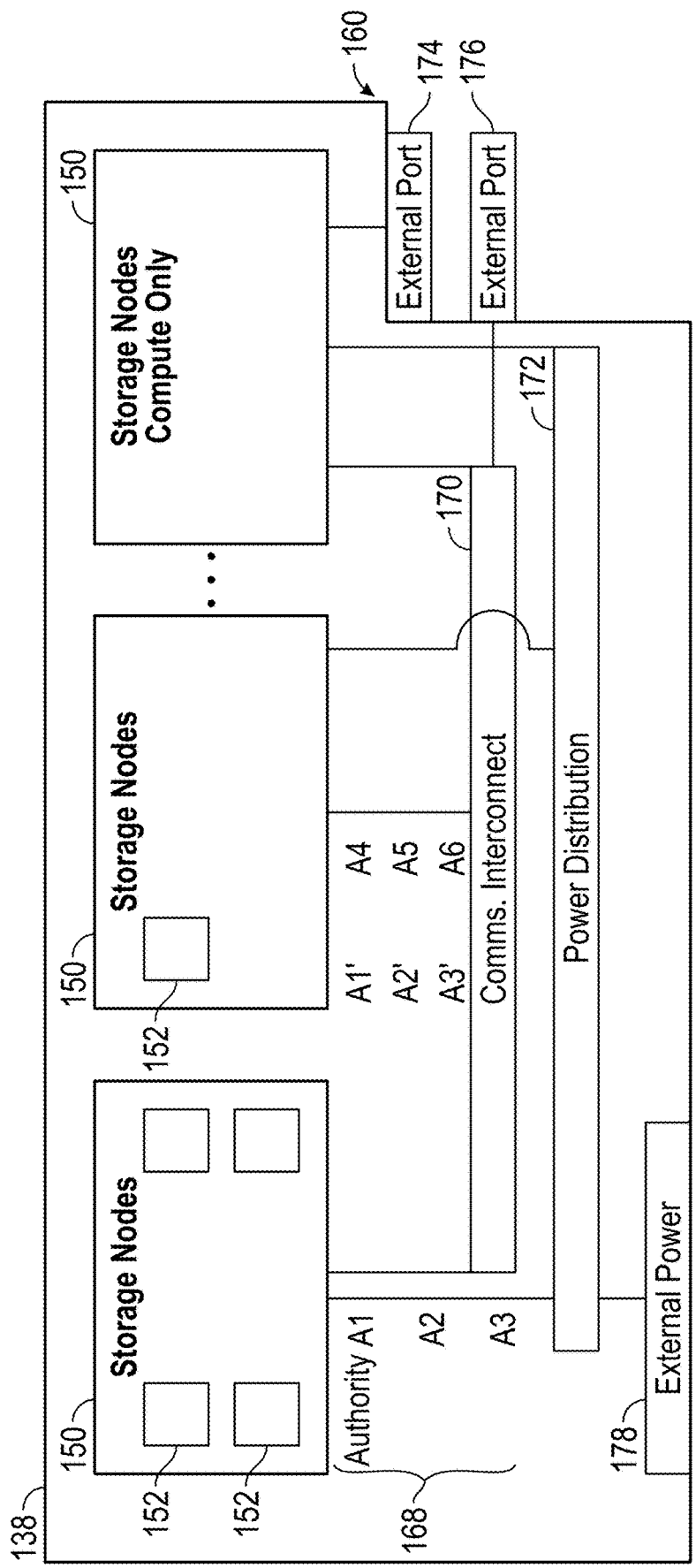
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of Mode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an Mode number or a data segment number. The output of this operation points to a non-volatile solid state storage 152 having the authority 168 for that particular piece of data. In some embodiments there are two stages to this operation. The first stage maps an entity identifier (ID), e.g., a segment number, Mode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or Mode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 5 and 7) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
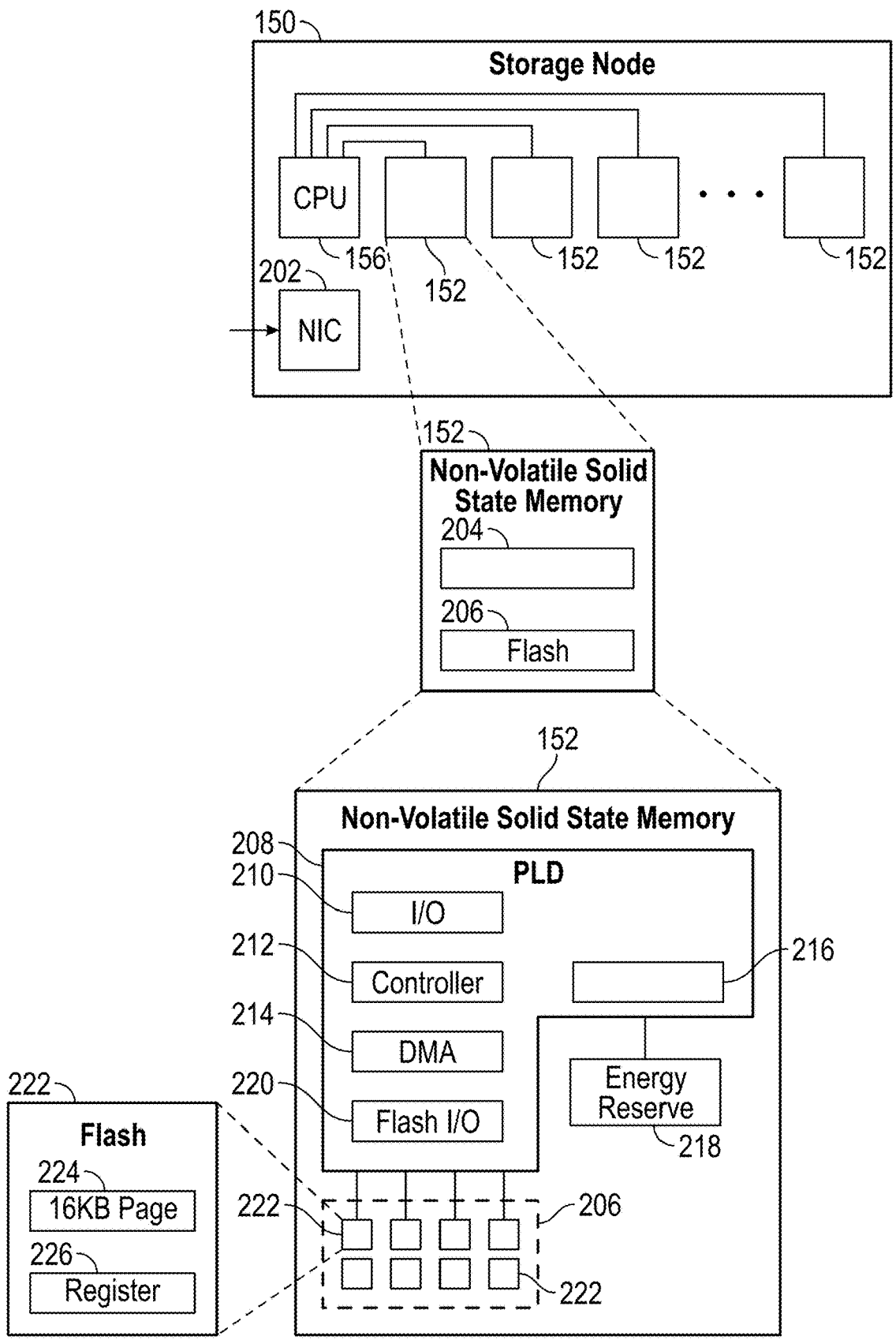
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
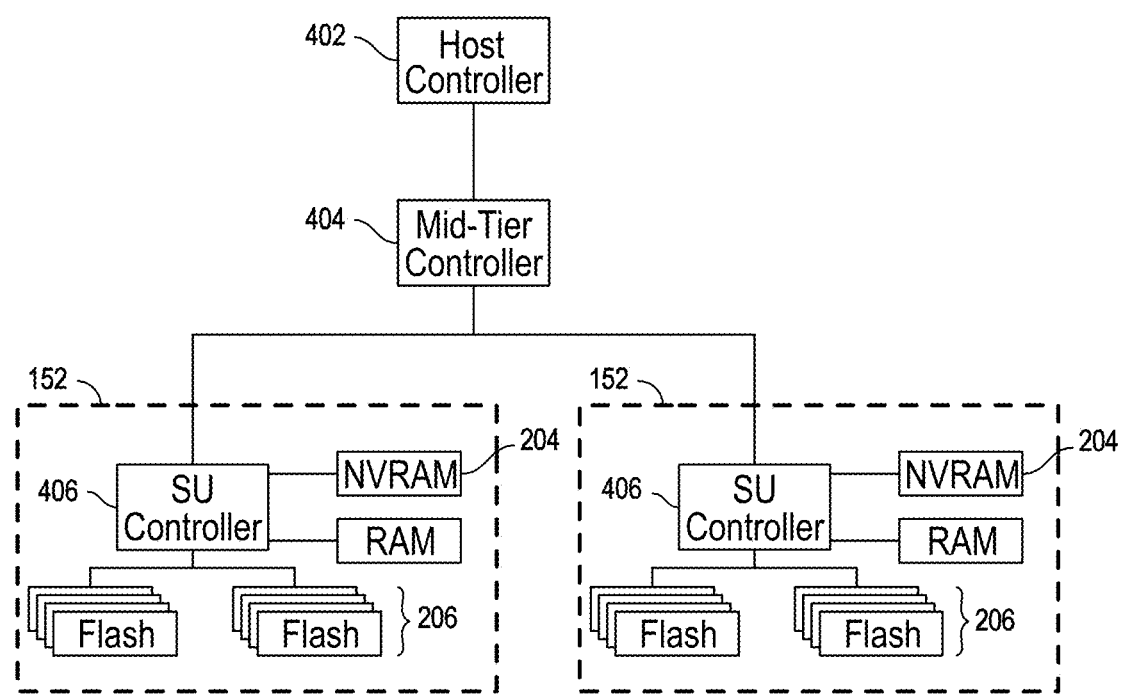
FIG. 4 shows a storage server environment, which uses embodiments of the storage nodes and storage units of FIGS. 1-3 in accordance with some embodiments.

FIG. 4 shows a storage server environment, which uses embodiments of the storage nodes 150 and storage units 152 of FIGS. 1-3. In this version, each storage unit 152 has a processor such as controller 212 (see FIG. 3), an FPGA (field programmable gate array), flash memory 206, and NVRAM 204 (which is super-capacitor backed DRAM 216, see FIGS. 2 and 3) on a PCIe (peripheral component interconnect express) board in a chassis 138 (see FIG. 1). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 512 independently. Each device provides an amount of storage space to each authority 512. That authority 512 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 512. This distribution of logical control is shown in FIG. 4 as a host controller 402, mid-tier controller 404 and storage unit controller(s) 406. Management of the control plane and the storage plane are treated independently, although parts may be physically co-located on the same blade. Each authority 512 effectively serves as an independent controller. Each authority 512 provides its own data and metadata structures, its own background workers, and maintains its own lifecycle.

Figure 5:
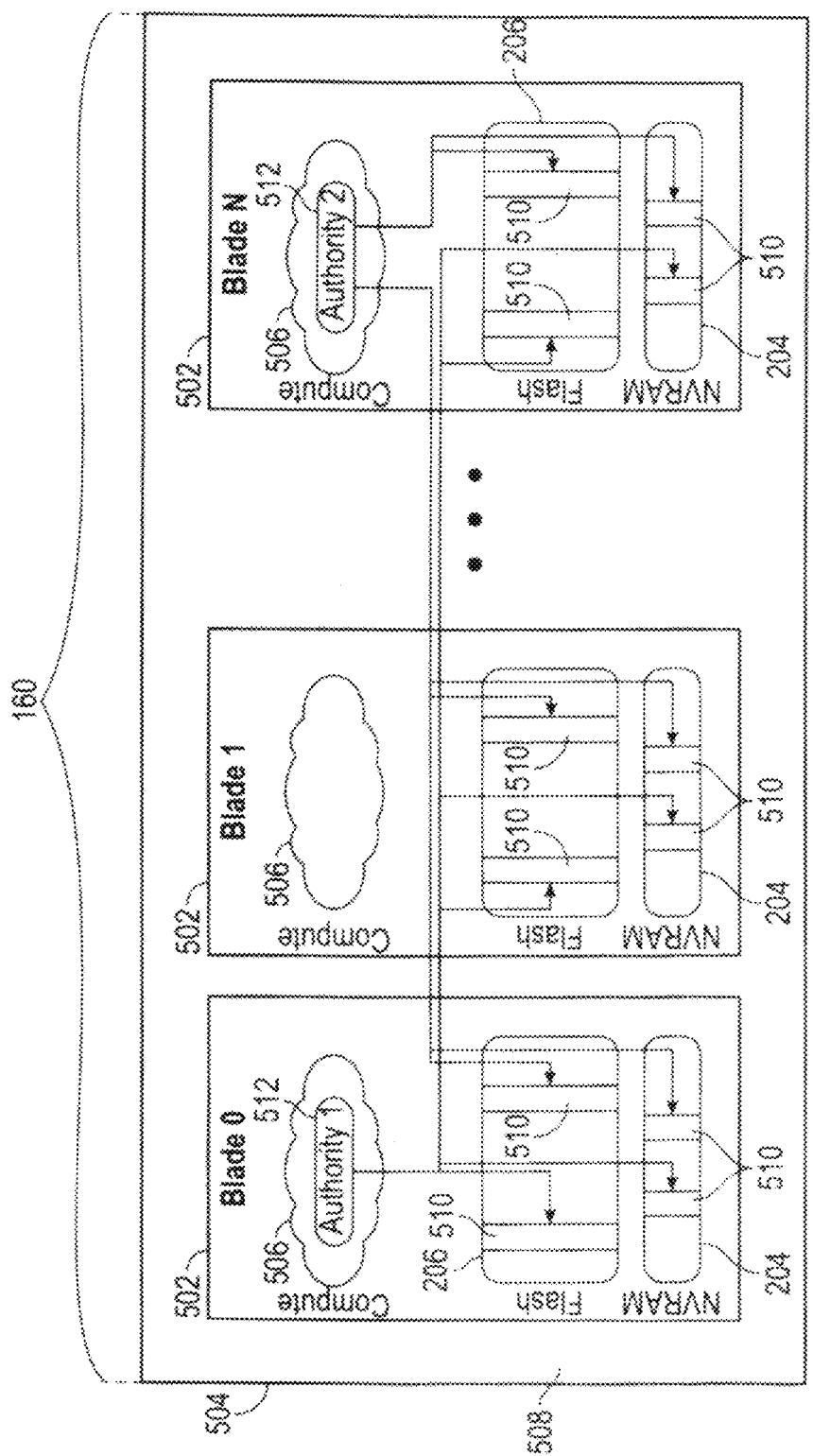
FIG. 5 is a blade hardware block diagram, showing a control plane, compute and storage planes, and authorities interacting with underlying physical resources, in accordance with some embodiments.

FIG. 5 is a blade 502 hardware block diagram, showing a control plane 504, compute and storage planes 506, 508, and authorities 512 interacting with underlying physical resources, using embodiments of the storage nodes 150 and storage units 152 of FIGS. 1-3 in the storage server environment of FIG. 4. The control plane 504 is partitioned into a number of authorities 512 which can use the compute resources in the compute plane 506 to run on any of the blades 502. The storage plane 508 is partitioned into a set of devices, each of which provides access to flash 206 and NVRAM 204 resources.

In the compute and storage planes 506, 508 of FIG. 5, the authorities 512 interact with the underlying physical resources (i.e., devices). From the point of view of an authority 512, its resources are striped over all of the physical devices. From the point of view of a device, it provides resources to all authorities 512, irrespective of where the authorities happen to run. Each authority 512 has allocated or has been allocated one or more partitions 510 of storage memory in the storage units 152, e.g. partitions 510 in flash memory 206 and NVRAM 204. Each authority 512 uses those allocated partitions 510 that belong to it, for writing or reading user data. Authorities can be associated with differing amounts of physical storage of the system. For example, one authority 512 could have a larger number of partitions 510 or larger sized partitions 510 in one or more storage units 152 than one or more other authorities 512. Authorities 168 of FIG. 2 and authorities 512 of FIG. 5 refer to the same construct.

Figure 6:
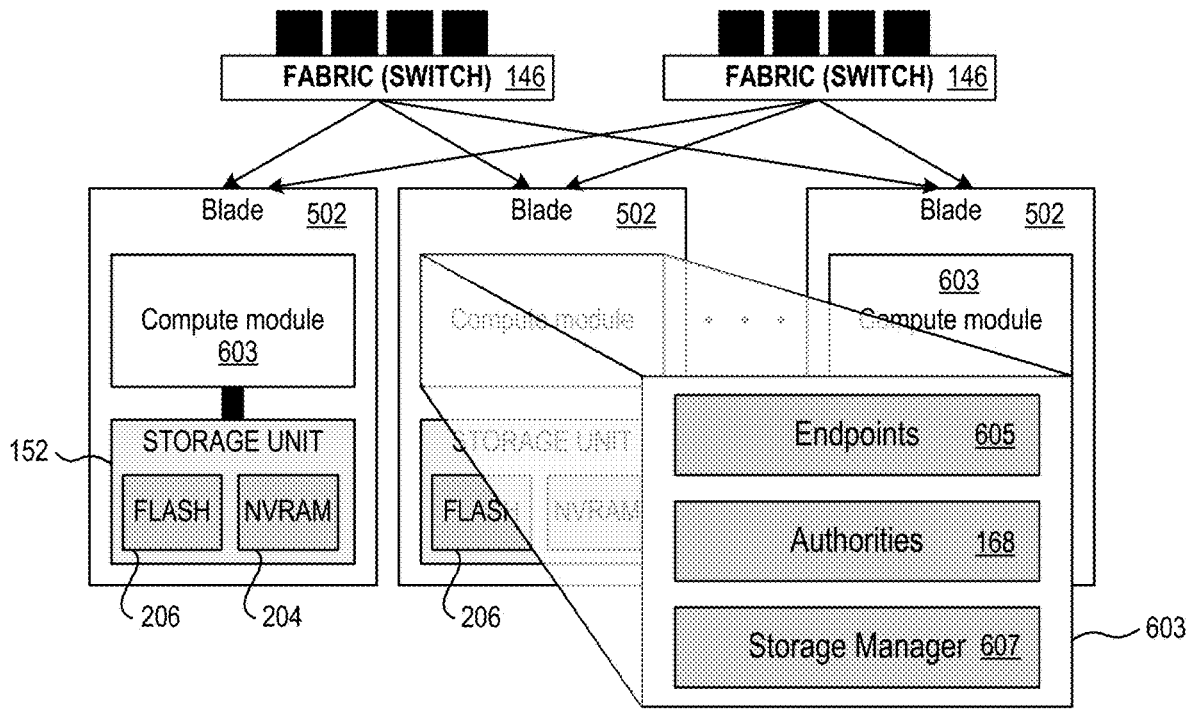
FIG. 6 depicts elasticity software layers in blades of a storage cluster, in accordance with some embodiments.

FIG. 6 depicts elasticity software layers in blades 502 of a storage cluster 160, in accordance with some embodiments. In the elasticity structure, elasticity software is symmetric, i.e., each blade's 502 compute module 603 runs the three identical layers of processes depicted in FIG. 6. Storage managers 607 execute read and write requests from other blades 502 for data and metadata stored in local storage unit 152 NVRAM 204 and flash 206. Authorities 168 fulfill client requests by issuing the necessary reads and writes to the blades 502 on whose storage units 152 the corresponding data or metadata resides. Endpoints 605 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 6, authorities 168 running in the compute modules 603 of a blade 502 perform the internal operations required to fulfill client requests. One feature of elasticity is that authorities 168 are stateless, i.e., they cache active data and metadata in their own blades' 168 DRAMs for fast access, but the authorities store every update in their NVRAM 204 partitions on three separate blades 502 until the update has been written to flash 206. All the storage system writes to NVRAM 204 are in triplicate to partitions on three separate blades 502 in some embodiments. With triple-mirrored NVRAM 204 and persistent storage protected by parity and Reed-Solomon RAID checksums, the storage system can survive concurrent failure of two blades 502 with no loss of data, metadata, or access to either.

Because authorities 168 are stateless, they can migrate between blades 502. Each authority 168 has a unique identifier. NVRAM 204 and flash 206 partitions are associated with authorities' 168 identifiers, not with the blades 502 on which they are running in some. Thus, when an authority 168 migrates, the authority 168 continues to manage the same storage partitions from its new location. When a new blade 502 is installed in an embodiment of the storage cluster 160, the system automatically rebalances load by:

Partitioning the new blade's 502 storage for use by the system's authorities 168,
Migrating selected authorities 168 to the new blade 502,
Starting endpoints 605 on the new blade 502 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 605 direct to them. Similarly, if a blade 502 fails or is removed, the system redistributes its authorities 168 among the system's remaining blades 502. The redistributed authorities 168 continue to perform their original functions from their new locations.

Figure 7:
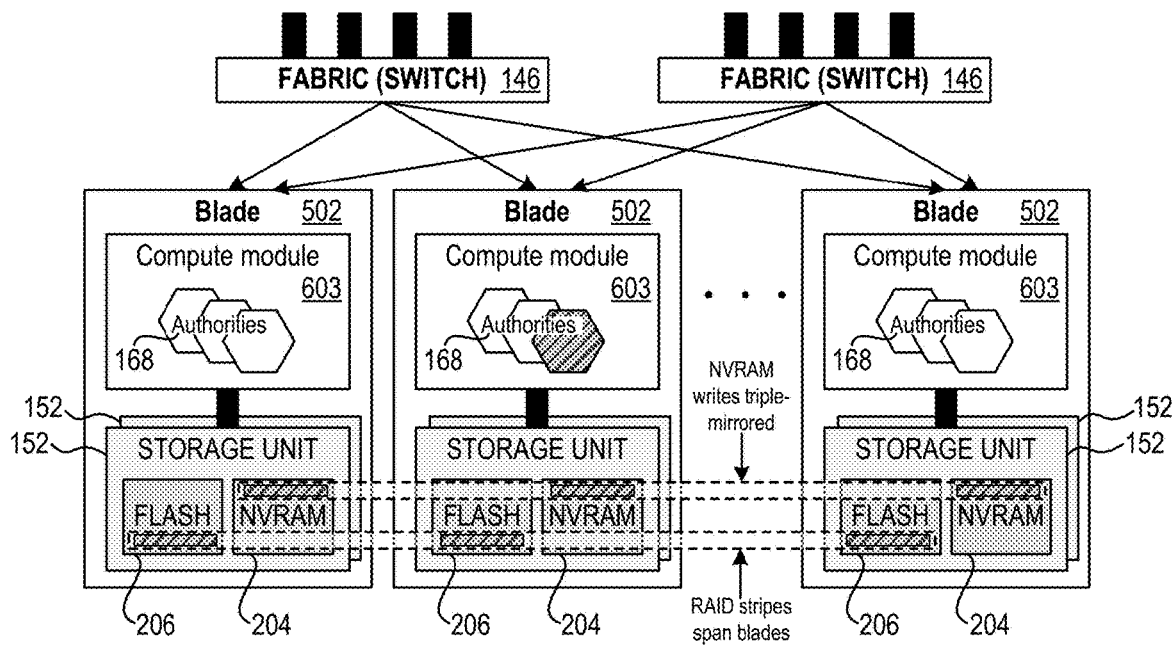
FIG. 7 depicts authorities and storage resources in blades of a storage cluster, in accordance with some embodiments.

FIG. 7 depicts authorities 168 and storage resources in blades 502 of a storage cluster, in accordance with some embodiments. Each authority 168 is exclusively responsible for a partition of the flash 206 and NVRAM 204 on each blade 502. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 607 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

Figure 8A:
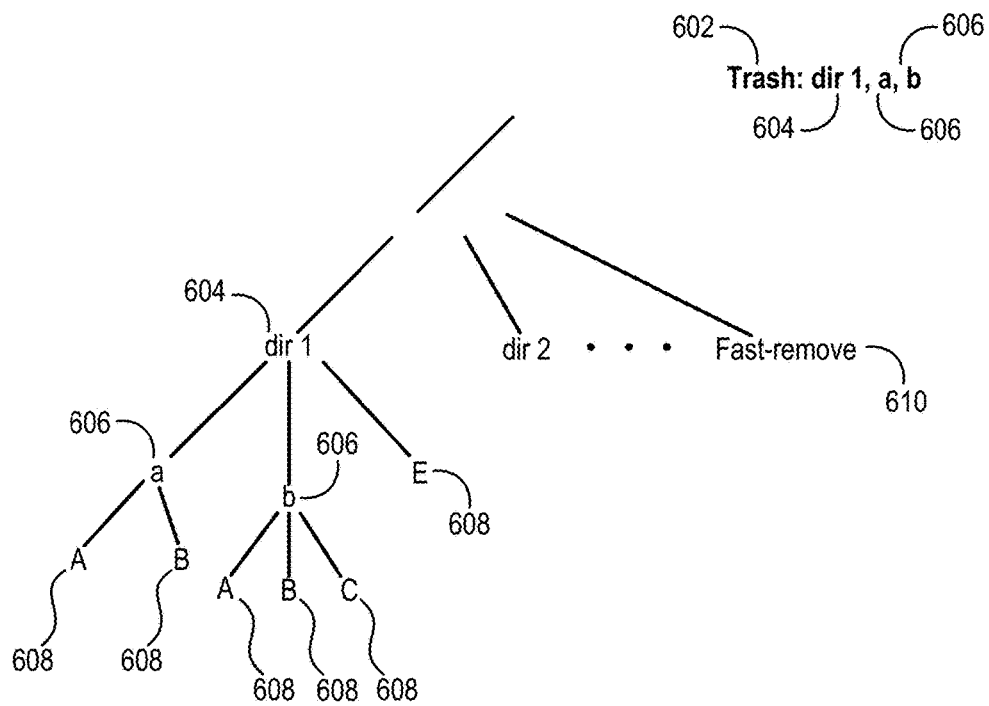
FIG. 8A is an action diagram showing a directory tree and a special-named directory for deleting a specified directory and the entire tree below that directory.

FIG. 8A is an action diagram showing a directory tree and a special-named directory 610 for deleting a specified directory 604 and the entire tree below that directory 604. In this example, the special-named directory 610 is "fast_remove", but the directory could also be named "tree_destroy", "directory_tree_delete" or any other reserved name to invoke the directory tree deleting properties of the special-named directory 610. Unlike ordinary directories 604, the special-named directory 610 conceals contents from the user, and does not show subdirectories, files, a tree or a partial tree, etc. Moving a directory 604 to (i.e., under) the special-named directory 610, for example using a UNIX command my directory-_name special-named_directory, directs or requests the storage system to delete the specified directory 604 and the entire tree below that directory 604, i.e., the parent directory 604 and all subdirectories 606 and all files 608 below that directory 604. Although this is one specific mechanism for requesting a tree deletion, other commands for deleting a tree, with or without specifying a special-named directory 610, such as "delete_tree directory_name" could be devised as an extension to an operating system or file system.

When the storage system is directed to delete an entire tree, the storage system establishes a trash list 602, which is then populated with names (or other identifying or addressing information) of directories 604, subdirectories 606 and files to be deleted. In FIG. 8A, this process has started, and the specified directory 604, "dir 1", and subdirectories 606 "a", "b" under the specified directory 604 have been added to the trash list 602.

Figure 8B:
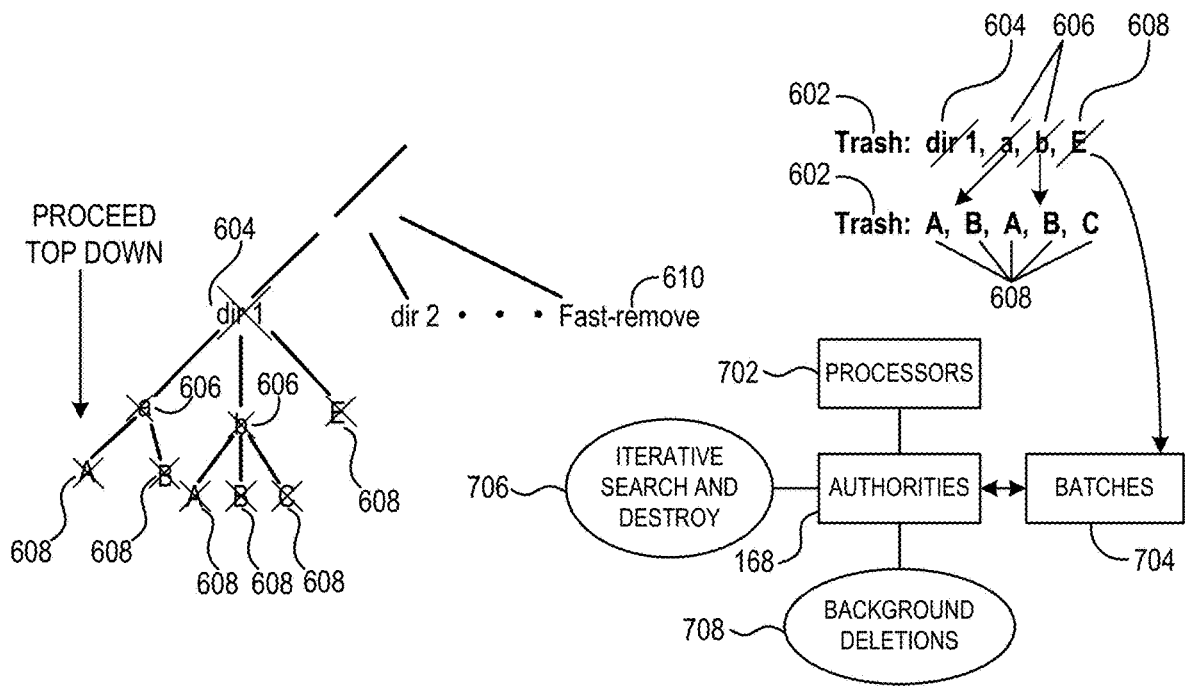
FIG. 8B continues the action diagram of FIG. 8A, and shows top-down iterative or recursive listing of a directory, subdirectories and files in a trash list, in some embodiments performed by processors on behalf of authorities, in iterative search and destroy processes with batch communication and background deletions.

FIG. 8B continues the action diagram of FIG. 8A, and shows top-down iterative or recursive listing of a directory 604, subdirectories 606 and files 608 in a trash list 602, in some embodiments performed by processors 702 on behalf of authorities 168, in iterative search and destroy 706 processes with batch 704 communication and background deletions 708. A multitasking computational system can parcel out threads and processes to perform the iterative search and destroy 706 and the background deletions 708 in parallel. In various embodiments as described with reference to FIGS. 1-7, authorities 168 perform the iterative search and destroy 706 and background deletions 708. The authorities 168 communicate among themselves, among storage nodes 150 and/or solid state storage units 152 in the storage cluster 160.

In a specific scenario for one embodiment, as shown in FIGS. 8A and 8B, an authority 168 for the special-named directory 610 determines which authority 168 is the owner of the Mode for the specified directory 604 that has been moved to the special-named directory 610 for tree deletion, and listed in the trash list 602. The special-named directory owning 610 authority 168 communicates with the specified directory 604 owning authority 168, e.g., by sending a message, to initiate the top-down iterative search and destroy 706 processes. Alternatively, authorities 168 poll or consult the trash list 602 to determine if a task is available. The specified directory 604 owning authority 168 determines the contents and respective authorities 168 for the contents of the specified directory 604, "dir 1", places those contents (e.g., names or other identifying information or addresses of subdirectories 606 or files 608) on to the trash list 602 and deletes the specified directory 604 from memory and deletes the name of the specified directory 604, or other identification or addressing information, from the trash list 602. The link from the specified directory 604 to whichever directory is above, in this case the root directory "/", is severed, so that the specified directory 604 is no longer visible to the file system or to a user. Also, the special-named directory 610 conceals visibility of the specified directory 604 or any contents thereof.

Proceeding top-down, the specified directory 604 owning authority 168 communicates to the authorities 168 identified as owning contents of the specified directory 604, e.g., by sending messages. Alternatively, authorities 168 discover what is on the trash list 602. Those authorities 168 proceed in the same iterative top-down manner, identifying contents of their own directories (now subdirectories 606) and respective authorities 168 for those contents (e.g., files 608 and/or further subdirectories 606), placing names, identifying information or addressing of those contents onto the trash list 602 and deleting the directories (e.g., subdirectories) owned by those authorities 168 and deleting the directories from the trash list 602. So, for example, after being contacted by the authority 168 for the specified directory 604 "dir 1", the authority 168 for the subdirectory 606 "a" identifies files 608 "A", "B" and authorities 168 for those files 608, and communicates to those authorities 168, while deleting the directory "a" and deleting the name "a" or other identifying or address information for the subdirectory 606 owned by the authority 168 from the trash list 602. Similarly, the authority 168 for the subdirectory 606 "b" identifies files 608 "A", "B", "C" and authorities 168 for those files 608, and communicates to those authorities 168, while deleting the directory "b" from memory and deleting the name "b" or other identifying or address information for the subdirectory 606 owned by that authority 168 from the trash list 602. Those authorities 168 for the Modes of the files 608 place identifying information or addresses for portions of the files 608, e.g., segment ID numbers or ranges of segment ID numbers, onto the trash list 602. Respective owners, i.e., authorities 168 in some embodiments, of entries on the trash list 602 perform background deletions 708 of the directory 604, subdirectories 606 and files 608 or portions of files 608, deleting these entries from the trash list as the background deletions 708 are performed. In some embodiments, the requests for performing the iterative search and destroy 706 processes, and the background deletions, are communicated among authorities 168 in batches 704.

In FIG. 8B, the trash list 602 is shown in various stages, with partial information present and deletions from the trash list 602 occurring as other entries are added. For example, in one iteration (at top right of FIG. 8B), the trash list 602 shows entries for the specified directory 604 "dir 1" and subdirectories 606 "a", "b" and the file 608 "E" being deleted through batches 704. Another iteration (at the middle right of FIG. 8B) has the trash list 602 showing the files 608 "A", "B" from the subdirectory 606 "a" and the files 608 "A", "B", "C" from the subdirectory 606 "b", which will soon be deleted in batches 704.

With ongoing reference to FIGS. 8A and 8B, one mechanism for employing the trash list 602 is as a communication center for the iterative search and destroy processes 706 and background deletions 708. When an entry, such as a directory 604, subdirectory 606, or file 608, is placed on the trash list 602, a background process (e.g., an authority 168 in some embodiments) can pick up that entry and enumerate the entry, that is, list what are the contents of the entry. In the case of a directory 604 or subdirectory 606, the background process lists the contents of the directory 604 or subdirectory 606 (e.g., more subdirectories 606 and/or files 608), and places corresponding entries onto the trash list 602. In the case of a file 608, the background process lists portions of the file, such as are owned by further authorities 168 in various embodiments. Once the enumeration has been done for the immediate contents of the directory 604 or subdirectory 606 (i.e., not the entire depth of the tree), the background process can delete the entry on the trash list and actually delete or commit to deleting the corresponding item, such as a directory 604, subdirectory 606, or file 608. Again in the case of a file 608, that background process could then either delete the file or contact further authorities 168 each of which could delete portions of the file owned by those authorities 168, or list the portions of the file on the trash list 602 for deletion by authorities 168 that own those portions of the file, in various embodiments. In some embodiments, the background deletions 708 are coordinated with garbage collection and recovery of physical memory, for example solid state storage memory. In some embodiments, authorities 168 other than owners of Modes could take on some of the iterative search and destroy 706 or background deletions 708, for example authorities 168 that are not busy performing reads or writes of user data.

A further benefit of the parallelism in the above mechanisms is that authorities 168 exchange batches 704, obtaining tasks according to the trash list 602, finding entries in directories 604 or subdirectory 606 that other authorities should free, and returning memory space for storage of metadata and user data. In some embodiments, since the freeing up of storage space is happening in parallel, commitment to data writes can also be made in parallel. The authorities 168 collectively can determine the amount of memory space made available, and schedule writes in accordance with the memory space available.

It should be appreciated that the deletion of the parent or specified directory 604 "dir 1" referenced in the tree deletion request does not wait for deletion of the leafs at the bottom of the tree (e.g., the files 608 at the bottom of FIG. 8B), and can proceed as soon as the specified directory 604 is placed on the trash list 602. Similarly, deletion of subdirectories 606 can proceed as soon as these subdirectories 606 are placed on the trash list 602. Or, deletion can occur later. Because the deletion of a directory 604 or subdirectory 606 does not depend on emptying that directory 604 or subdirectory 606, the background deletions 708 can proceed in parallel and in any order. Processing of any subtree can be performed without concern of consistency with other processing of other subtrees. Further examples with taller or wider directory trees, and other names or conventions for directories or files are readily devised in keeping with the teachings herein. The above-described examples and mechanisms can be extended to trees with hundreds, thousands or millions, etc., of subdirectories and files.

With reference back to FIGS. 3-7, some embodiments of the storage cluster 160 have power loss recovery for the distributed file and directory deletion mechanisms described above. In the case of power loss, the trash list 602 is flushed from NVRAM 204 to flash memory 206 (e.g., along with other data and metadata in the system). Upon restart, the trash list is recovered from the flash memory 206, back to NVRAM 204. Then, the iterative search and destroy 706 and background deletions 708 can continue.

Figure 9A:
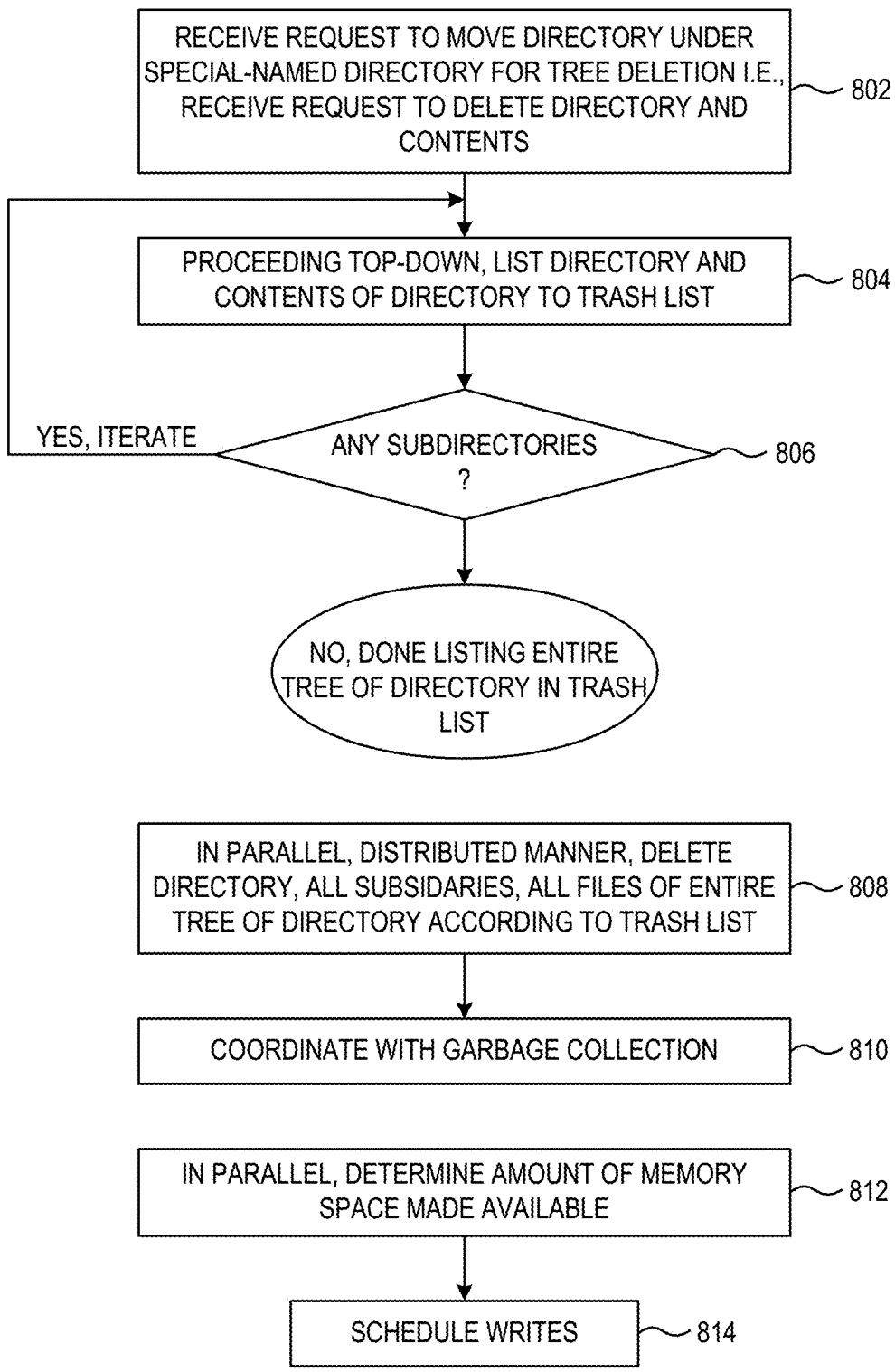
FIG. 9A is a flow diagram of a method for distributed directory and file deletion of a directory tree, which can be practiced in the storage cluster of FIGS. 1-5, and in further storage systems, in accordance with some embodiments as described with reference to FIGS. 6 and 7.

FIG. 9A is a flow diagram of a method for distributed directory and file deletion of a directory tree, which can be practiced in the storage cluster of FIGS. 1-7, and in further storage systems, in accordance with some embodiments as described with reference to FIGS. 8A and 8B. Some or all of the actions in the method can be performed by various processors, such as processors in storage nodes or processors in storage units. In an action 802, a request is received to move a directory under a special-named directory for tree deletion. That is, a request is received to delete a directory and contents. In some embodiments, the request is specific to the special-named directory and a specified directory for tree deletion, and in other embodiments, the request does not mention a special-named directory. In an action 804, proceeding top-down, directory and contents of the directory are listed to a trash list. In the decision action 806, it is determined whether there are any subdirectories below the listed directory. If yes, there is at least one subdirectory in the directory, flow proceeds to iterate, and returns to the action 804 to proceed from each subdirectory in a top-down manner to list the directory and contents of the directory to the trash list. Multiple processes can be spawned in parallel, in some embodiments. If no, there is no subdirectory in the directory, then the process is done listing the entire tree of the directory in the trash list. The actions 802, 804, 806 thus show an iterative, recursive, top-down process of listing directories and contents for an entire directory tree to the trash list, for deletion.

In the action 808, in a parallel, distributed manner, the directory, all subdirectories and all files of the entire tree of the directory are deleted according to the trash list. In the action 810, the parallel distributed deletions of the action 808 are coordinated with garbage collection. In the action 812, in parallel with the actions 808, 810, the amount of memory space made available is determined. Authorities in the storage cluster, freeing up memory space by performing the deletions, make the determination collectively, in some embodiments. In the action 814, writes are scheduled, in accordance with the amount of memory space made available. Authorities in the storage cluster schedule the writes, in some embodiments.

Figure 9B:
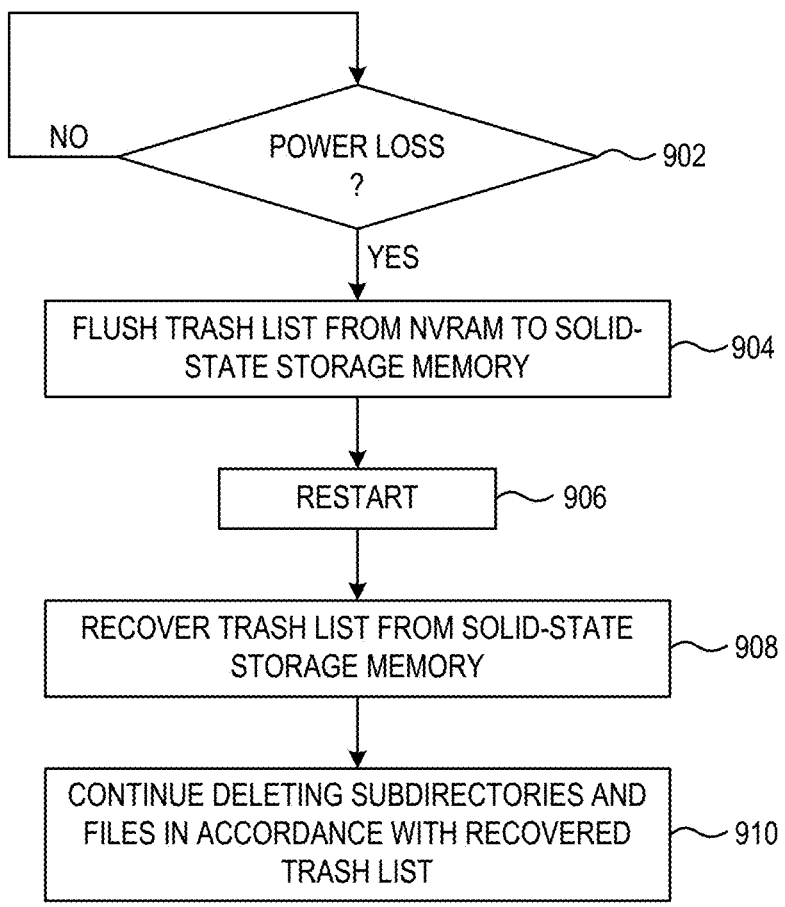
FIG. 9B is a further flow diagram of a method for recovery from power loss, which can be practiced to augment the method of FIG. 9A.

FIG. 9B is a further flow diagram of a method for recovery from power loss, which can be practiced to augment the method of FIG. 9A. In a decision action 902, it is determined whether there is a power loss. If no power loss, flow loops back to the action 902. If yes, there is a power loss, in the action 904 the trash list is flushed from NVRAM to solid state storage memory. The flushing is supported by an energy reserve in a storage unit, in some embodiments. In an action 906, the storage system is restarted (e.g., upon restoration of power). In an action 908, the trash list is recovered from solid-state storage memory. For example, the trash list is read from the flash memory and written to the NVRAM. In an action 910, the storage system continues deleting subdirectories and files in accordance with the recovered trash list. It should be appreciated that while the embodiments describe a power loss as triggering the actions, this is not meant to be limiting. The actions may be triggered by any other faults that interrupt processing in a manner that requires recovery or a restart of the system. That is, the embodiments may be extended to include any type of faults, e.g., hardware faults, operating system faults, software faults, or network faults, that interrupt the process in a way that requires recovery.

Figure 10:
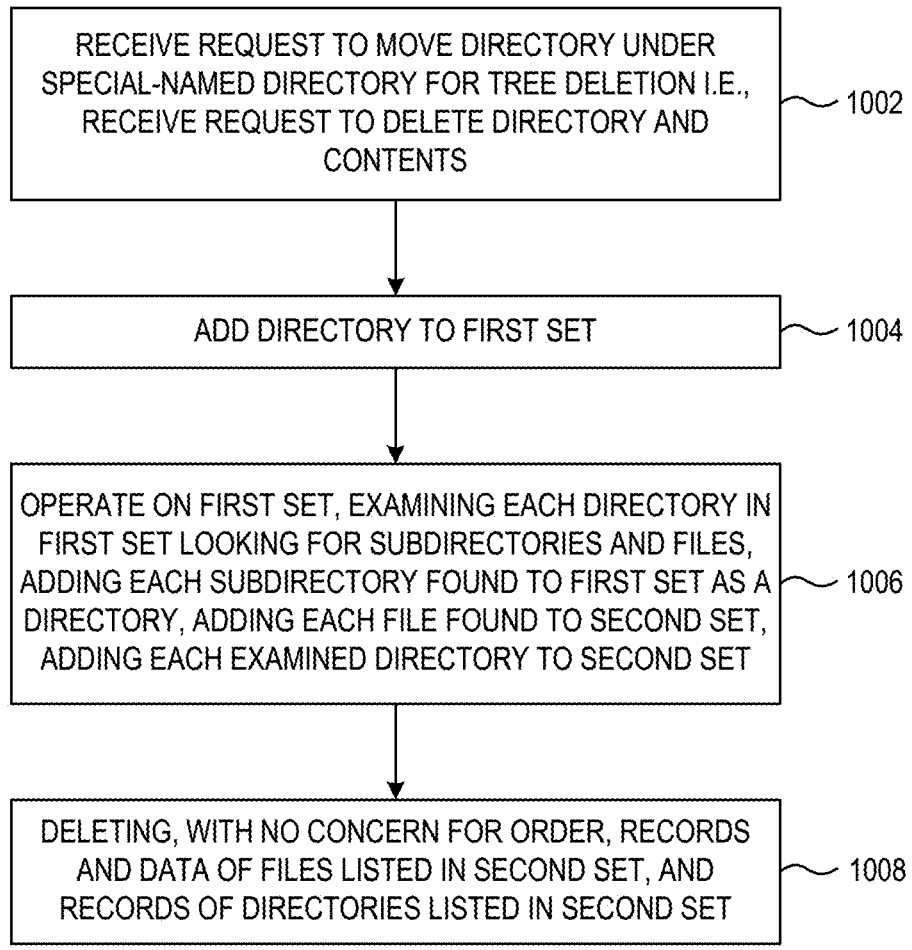
FIG. 10 is a further flow diagram of a method for distributed directory and file deletion of a directory tree, as a variation of the method shown in FIG. 8.

FIG. 10 is a further flow diagram of a method for distributed directory and file deletion of a directory tree, as a variation of the method shown in FIGS. 9A and 9B. The method of FIG. 10 can be practiced in the storage cluster of FIGS. 1-7, and in further storage systems, in accordance with some embodiments as described with reference to FIGS. 8A and 8B. Some or all of the actions in the method can be performed by various processors, such as processors in storage nodes or processors in storage units. In an action 1002, a request is received to move a directory under a special-named directory for tree deletion. That is, a request is received to delete a directory and contents. In some embodiments, the request is specific to the special-named directory and a specified directory for tree deletion, and in other embodiments, the request does not mention a special-named directory. In an action 1004, the directory is added to a first set. The first set is in a memory in the storage cluster or other storage system, in some embodiments. In an action 1006, the first set is operated on, by examining each directory in the first set looking for subdirectories and files, adding each directory so found to a first set as a directory, adding each file so found to a second set stored in memory in the storage cluster or other storage system, and adding each examined directory to the second set. In some embodiments, the actions for operating on the first set are performed by various authorities in a storage cluster.

Still referring to FIG. 10, in an action 1008, records and data of files listed in the second set, and records of directories listed in the second set are deleted, with no concern for order. As soon as all sub-directories within a parent directory have been identified for deletion, all other contents in the parent directory can be deleted as can the parent directory itself. This mechanism can proceed at any rate, and all directories identified as having been processed for subdirectories can be deleted at any rate and in any order, and with any reasonable level of parallelism or distribution across the environment. It should be appreciate that this is due to the fact that there is no concern with either dangling references, e.g., a reference to a parent that no longer exists, or with transactional consistency of the tree, e.g., whether whatever does or does not remain of the directory hierarchy can be reconstructed back into a rooted tree.

This procedure identifies both files and directories for deletion based on the first set, and deletes both files and directories that have been added to the second set which is now of files and directories. A variation of this procedure identifies directories for deletion based on the first set, adding subdirectories of each directory examined in the first set back to the first set as directories and listing examined directories in the second set. The procedure also deletes files found in directories as well as the directories themselves when the directories are found in the second set, i.e., based on the listing of directories in the second set. The embodiments also allow deletions from the second set to proceed in parallel with generation of the second set from the first set. In some versions, the second set is used as a source for a trash list described in FIGS. 9A and 9B, and in other versions, the second set is the trash list.

The embodiments described above may be integrated with the ability to introduce a traditional trash delay that allows listing and retrieval for some period of time (e.g., 24 hours or some other suitable time period). For example, the trash directory can operate by continuing to contain whatever content is moved into the trash directory. When the time limit has expired the file or directory is unlinked from the trash directory and the procedure described above is then followed to ensure efficient parallel deletion. Thus, in some embodiments, there may be a delay for a time span, responsive to receiving the request in operation 1002, wherein the adding, the operating, and the deleting (operations 1004, 1006, and 1008) occur upon expiration of the time span, and wherein the contents of the directory are retrievable during the time span. In some embodiments, rather than a time limit expiring to trigger the embodiments described above, alternatives such as an additional step taken to mark a file or directory for immediate removal, perhaps by moving the file or directory to some other special directory, perhaps by allowing a delete or 'rmdir' operation even for a non-empty directory in the trash directory, or perhaps by running some another special command, may be utilized. A file or directory could be retrieved from the trash directory by moving the file or directory out prior to beginning its parallel removal. Some extended attribute could also be used to record the original location, and a utility could be written to restore the file or directory to its original location in some embodiments.

Figure 11:
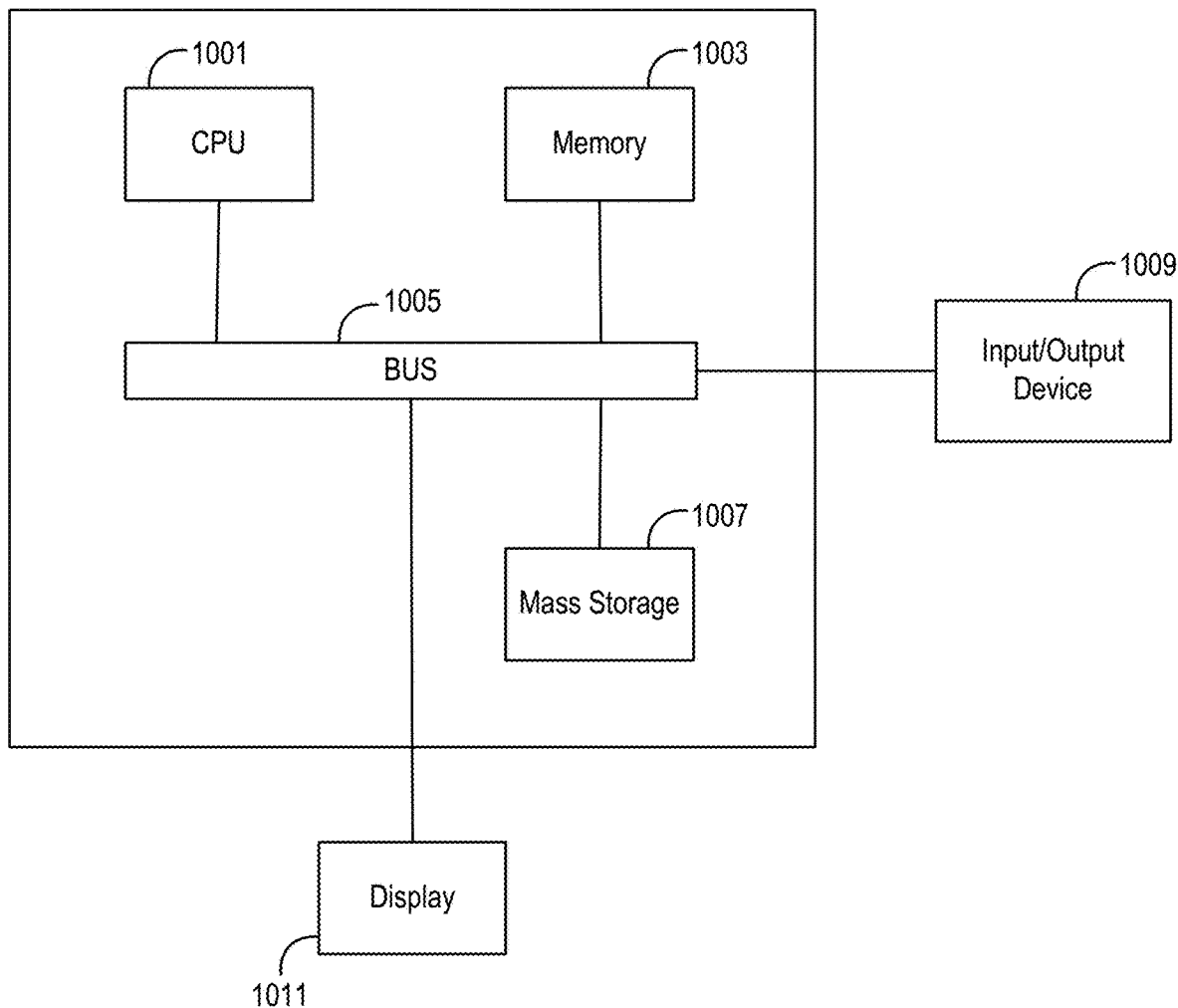
FIG. 11 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 11 is an illustration showing an exemplary computing device which may implement the embodiments described herein. The computing device of FIG. 11 may be used to perform embodiments of the functionality for the distributed directory tree (i.e., hierarchy) and file deletion in accordance with some embodiments. The computing device includes a central processing unit (CPU) 1101, which is coupled through a bus 1105 to a memory 1103, and mass storage device 1107. Mass storage device 1107 represents a persistent data storage device such as a floppy disc drive or a fixed disc drive, which may be local or remote in some embodiments. Memory 1103 may include read only memory, random access memory, etc. Applications resident on the computing device may be stored on or accessed via a computer readable medium such as memory 1103 or mass storage device 1107 in some embodiments. Applications may also be in the form of modulated electronic signals modulated accessed via a network modem or other network interface of the computing device. It should be appreciated that CPU 1101 may be embodied in a general-purpose processor, a special purpose processor, or a specially programmed logic device in some embodiments.

Display 1111 is in communication with CPU 1101, memory 1103, and mass storage device 1107, through bus 1105. Display 1111 is configured to display any visualization tools or reports associated with the system described herein. Input/output device 1109 is coupled to bus 1105 in order to communicate information in command selections to CPU 1101. It should be appreciated that data to and from external devices may be communicated through the input/output device 1109. CPU 1101 can be defined to execute the functionality described herein to enable the functionality described with reference to FIGS. 1-10. The code embodying this functionality may be stored within memory 1103 or mass storage device 1107 for execution by a processor such as CPU 1101 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system that is implemented with physical computing resources.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method, comprising:
 receiving, at a storage system, a request to delete a directory and contents of the directory;
 adding the directory to a first set, listed in a memory in the storage system;
 operating on the first set, by examining each directory in the first set to identify subdirectories, adding each identified subdirectory to the first set as a directory, and adding each examined directory to a second set listed in the memory, responsive to the request to delete the directory and the contents of the directory;
 deleting in a distributed manner across the storage system, contents of directories, and the directories, listed in the second set, responsive to the request to delete the directory and the contents of the directory; and
 delaying for a time span, responsive to receiving the request, wherein the adding, the operating, and the deleting occur upon expiration of the time span, and wherein the contents of the directory are retrievable during the time span.
2. The method of claim 1, wherein the receiving the request comprises:
 receiving a request to move the directory under a named directory that conceals the directory and contents to a client.

3. The method of claim 1, further comprising:
communicating a plurality of batch lists to a plurality of processors in the storage system, each of the plurality of batch lists listing a subset of the directory, wherein the deleting the directory is in accordance with the plurality of batch lists.

4. The method of claim 1, further comprising:
determining an amount of memory space made available by the request to delete the directory; and
scheduling a plurality of writes to the storage system, in accordance with the determining and in parallel with the deleting.

5. The method of claim 1, wherein:
the operating on the first set further comprises examining each directory in the first set to identify files, and adding each identified file to the second set; and
the deleting in a distributed manner across the storage system, the contents of the directories further comprises deleting data and records of the files listed in the second set and wherein the deleting is performed without concern for order.

6. The method of claim 1, wherein the deleting comprises:
coordinating the deleting of the directory with garbage collection in each of a plurality of solid-state storage units of the storage system.

7. The method of claim 1, further comprising:
writing directory names of the directories listed in the second set and all files of the directories listed in the second set to a trash list in NVRAM (nonvolatile random-access memory) of the storage system;
flushing the trash list from the NVRAM to solid-state storage memory in the storage system, responsive to detecting a power loss in the storage system; and
recovering the trash list from the solid-state storage memory, to continue the deleting upon restart after the power loss.

8. A tangible, non-transitory, computer-readable media having instructions thereupon which, when executed by a processor, cause the processor to perform a method comprising:
receiving, at the storage system, a request to delete a directory and contents of the directory;
adding the directory to a first set, listed in a memory in the storage system;
operating on the first set, by examining each directory in the first set to identify subdirectories, adding each identified subdirectory to the first set as a directory, and adding each examined directory to a second set listed in the memory, responsive to the request to delete the directory and the contents of the directory;
deleting in a distributed manner across the storage system, contents of directories, and the directories, listed in the second set, responsive to the request to delete the directory and the contents of the directory; and
delaying for a time span, responsive to receiving the request, wherein the adding, the operating, and the deleting occur upon expiration of the time span, and wherein the contents of the directory are retrievable during the time span.

9. The computer-readable media of claim 8, wherein the receiving the request comprises:
receiving a request to move the directory under a named directory that conceals the directory and contents to a client.

10. The computer-readable media of claim 8, wherein the method further comprises:
communicating a plurality of batch lists to a plurality of processors in the storage system, each of the plurality of batch lists listing a subset of the directory, wherein the deleting the directory is in accordance with the plurality of batch lists.

11. The computer-readable media of claim 8, wherein the method further comprises:
determining an amount of memory space made available by the request to delete the directory; and
scheduling a plurality of writes to the storage system, in accordance with the determining and in parallel with the deleting.

12. The computer-readable media of claim 8, wherein the listing for deletion, and the deleting, are performed by a plurality of authorities in the storage system, with each inode, range of data, and sub-directory owned by an authority.

13. The computer-readable media of claim 8, wherein the deleting comprises:
coordinating the deleting of the directory with garbage collection in each of a plurality of solid-state storage units of the storage system and wherein the deleting is performed without concern for order.

14. A storage system, comprising:
storage memory; and
a plurality of storage nodes, each having one or more processors, the plurality of storage nodes configurable to cooperate to perform a method comprising:
receiving, at the storage system, a request to delete a directory and contents of the directory;
adding the directory to a first set, listed in a memory in the storage system;
operating on the first set, by examining each directory in the first set to identify subdirectories, adding each identified subdirectory to the first set as a directory, and adding each examined directory to a second set listed in the memory, responsive to the request to delete the directory and the contents of the directory;
deleting in a distributed manner across the storage system, contents of directories, and the directories, listed in the second set, responsive to the request to delete the directory and the contents of the directory; and
delaying for a time span, responsive to receiving the request, wherein the adding, the operating, and the deleting occur upon expiration of the time span, and wherein the contents of the directory are retrievable during the time span.

15. The storage system of claim 14, wherein the receiving the request comprises:
receiving a request to move the directory under a named directory that conceals the directory and contents to a client, and wherein the deleting is performed without concern for order.

16. The storage system of claim 14, wherein the method further comprises:
communicating a plurality of batch lists to a plurality of processors in the storage system, each of the plurality of batch lists listing a subset of the directory, wherein the deleting the directory is in accordance with the plurality of batch lists.

17. The storage system of claim 14, wherein the method further comprises:
determining an amount of memory space made available by the request to delete the directory rectory; and scheduling a plurality of writes to the storage system, in accordance with the determining and in parallel with the deleting.

18. The storage system of claim 14, wherein the listing for deletion, and the deleting, are performed by a plurality of authorities in the storage system, with each inode, range of data, and sub-directory owned by an authority.

19. The storage system of claim 14, wherein the deleting comprises:
coordinating the deleting of the directory with garbage collection in each of a plurality of solid-state storage units of the storage system.

20. The storage system of claim 14, wherein the method further comprises:
writing directory names of the directories listed in the second set and all files of the directories listed in the second set to a trash list in NVRAM (nonvolatile random-access memory) of the storage system;
flushing the trash list from the NVRAM to solid-state storage memory in the storage system, responsive to detecting a power loss in the storage system; and
recovering the trash list from the solid-state storage memory, to continue the deleting upon restart after the power loss.

\* \* \* \* \*